United States Patent [19]

Suzuki et al.

[11] Patent Number: 4,748,675

[45] Date of Patent: May 31, 1988

[54] METHOD FOR CONTROLLING IMAGE PROCESSING DEVICE

[75] Inventors: Kenji Suzuki, Yokosuka; Seiji Hata, Fujisawa; Masao Tsuji, Funabashi, all of Japan

[73] Assignee: Hitachi, Ltd., Tokyo, Japan

[21] Appl. No.: 795,775

[22] Filed: Nov. 7, 1985

[30] Foreign Application Priority Data

Nov. 9, 1984 [JP] Japan .................................. 59-234957
Nov. 9, 1984 [JP] Japan .................................. 59-234958

[51] Int. Cl.⁴ ............................................ G06K 9/48
[52] U.S. Cl. ........................................ 382/21; 382/14; 382/22
[58] Field of Search .................... 382/14, 16, 21, 22, 382/25

[56] References Cited

U.S. PATENT DOCUMENTS 4,493,105  1/1985  Beall et al. ........................ 382/21
4,545,067 10/1985  Juvin et al. ....................... 382/21
4,555,801 11/1985  Miyagama et al. ................. 382/44
4,556,985 12/1985  Hongo .............................. 382/30
4,565,124  1/1986  Yamamoto et al. ................. 382/22
4,566,126  1/1986  Miyagawa et al. ................. 382/48

OTHER PUBLICATIONS

"Decomposition of Polymers into Simpler Components: Feature Generation for Syntactic Pattern Recognition" by Hou-Yuan F. Ferg et al, IEEE Transactions on Computers, vol. C24, No. 6, 1975.

Primary Examiner—Leo H. Boudreau
Attorney, Agent, or Firm—Antonelli, Terry & Wands

[57] ABSTRACT

A method for controlling an image processing device wherein the contour of a certain segment of an image, or pattern is polygonal-approximated so that it is represented by a row of vertex data and the row of vertex data is processed to recognize the shape of the segment. This method comprises the steps of describing an image processing procedure as a program by a programming language incorporating a group of image processing instructions, and executing this program by the image processing whereby several different image procedures can be performed for image processing according to different uses. This method also controls the image processing procedure using a program written by a programming language incorporating variables representing the structure inherent in the image data.

3 Claims, 10 Drawing Sheets

| NAME | STRUCTURE | CONTENT | REMARKS |
|---|---|---|---|
| Gn | TWO-DIMENSIONAL ARRAY | GREY SCALE IMAGE | SIZE DEPENDS ON HARDWARE |
| Bn | TWO-DIMENSIONAL ARRAY | BINARY IMAGE | SIZE DEPENDS ON HARDWARE |
| Mn | TWO-DIMENSIONAL ARRAY | MASK IMAGE | SIZE DEPENDS ON HARDWARE |
| Cn | ONE-DIMENSIONAL INTEGER | CAMERA NUMBER | PERMISSIBLE VALUE DEPENDS ON HARDWARE |
| Tn | 8×n (VARIABLE LENGTH) ARRANGEMENT | SEGMENT TABLE | SEE FIG. 4 FOR DETAILS |
| Ln | 2×n (VARIABLE LENGTH) ARRANGEMENT | VERTEX COORDINATE ROW | |

NUMBER OF SEGMENT = 8
BACKGROUND SEGMENT NO. = 3

FIG. 5

| NAME / FORMAT | | FUNCTION |
|---|---|---|
| | THDSET △ | SETTING OF BINARY-DIGITIZED THRESHOLD VALUE |
| | PICTURE △ Cn, Gn, Bn, | IMAGE INPUT |
| | PICTURES △ Cm, Gn, Bn [Mn] | IMAGE INPUT + SEGMENT |
| | MASK △ Mn | MASK SETTING |
| IMAGE DISPLAY | GDISP Gn [Mn] | GREY SCALE IMAGE DISPLAY |
| | BDISP Bn [Mn] | BINARY IMAGE DISPLAY |
| | LDISP Ln | POLYGON DISPLAY |
| | SEGMENT Bn Tn [Mn] | SEGMENTATION |
| | ANALYZE Tn | IMAGE STRUCTURE ANALYSIS |
| | LINSEG Tn, i | POLYGONAL APPROXIMATION<br>i: SEGMENT NO. DESIGNATION |
| | LINALL Tn, i | POLYGONAL APPOXIMATION FOR i-th SEGMENT AND DEPENDENT SEGMENT |
| MATCHING | LSHIFT Ln, X, Y | POLYGON PARALLEL SHIFT, AMOUNT OF SHIFT (X,Y) |
| | LROTAT Ln, X, Y, T | POLYGON CENTER |
| | MATCH (Ln, Ln) | INTEGRATED GRAPHIC AREA (INTEGER FORM) |
| CHARACTERISTIC VALUE FUNCTION | AREA (Ln) | AREA |
| | PERIM (Ln) | PERIMETER |
| | GX (Ln) | GRAVITY CENTER X COORDINATE |
| | GY (Ln) | GRAVITY CENTER Y COORDINATE |
| | RMAX (Ln, X, Y) | FARTHEST VERTEX NO. FROM (X, Y) |
| | MMTMAJ (Ln) | MOMENT OF INERTIA AROUND MAIN AXIS (TRANSVERSE AXIS) |
| | MAJOR (Ln) | TRANSVERSE AXIS LENGTH OF EQUIVALENT ELLIPSE |
| | MMTMIN (Ln) | MOMENT OF INERTIA AROUND MAIN AXIS (CONJUGATE AXIS) |
| | MINOR (Ln) | CONJUGATE AXIS LENGTH OF EQUIVALENT ELLIPSE |
| | ORIENT (Ln) | ANGLE OF MAIN AXIS (TRANSVERSE AXIS) FORMED WITH X-AXIS |
| SEGMENT INFORMATION REFERENCE | TSUM (Tn) | NUMBER OF SEGMENTS |
| | TTOP (Tn) | BACKGROUND SEGMENT NO. |
| | TDOWN (Tn, i) | CHILD SEGMENT NO. OF t |
| | TNEXT (Tn, i) | BROTHER SEGMENT NO. OF i |
| | TUP (Tn, i) | PARENT SEGMENT NO. OF i |
| | COLOR (Tn, i) | COLOR OF i |
| | CELLS (Tn, i) | NUMBER OF CELL OF i |

FIG. 6A

PART 1   PART 2   PART 3

FIG. 6C

```
10   PICTURE C1,G1,B1  ---------------------- S 11
20   SEGMENT B1,T1     ---------------------- S 12
30   ANALYZE T1        ---------------------- S 13
40   I = TTOP (T1)     ⎱
50   J = TDOWN (T1,I)  ⎰ ---------------------- S 14
60   LINSEG T1,J,L1    ---------------------- S 15
70   S = AREA (L1)     ---------------------- S 16
80   ER = 0            ---------------------- S 17
90   IF S<A0 THEN ER=1 : GOSUB ERR ---------- S 18
100  IF S<A1           ---------------------- S 19
110  IF S<A2           ---------------------- S 20
120  IF S  A3          ---------------------- S 21
130  ER = 1 : GOSUB ERR
          ⋮
```

```
10   PICTURE C1,G1,B1  ------------------------  S 21
20   SEGMENT B1,T1  ---------------------------  S 22
30   ANALYZE T1  ------------------------------  S 23
40   I = TTOP (T1)      ⎫
50   J = TDOWN (T1,I)   ⎬ -----------------------  S 24
60   LINSEG T1,J,L1  ---------------------------  S 25
70   DX = GX (L1) - XO      ⎫
80   DY = GY (L1) - YO      ⎪
90   DT = ORIENT (L1) - TO  ⎬ ------------------  S 26
100  LSHIFT L1,DX,DY        ⎪
110  LROTATE L1,D1,XO,YO    ⎭
120  S1 = MATCH (LO,L1) * 100  ⎫
130  SO = AREA (LO)  98        ⎬ --------------  S 27
140  IF SO<S1 THEN ST=O ELSE ST=1 ⎭
```

FIG. 7B

METHOD FOR CONTROLLING IMAGE PROCESSING DEVICE

BACKGROUND OF THE INVENTION

1. Field of the Invention

This invention relates to an image processing device and more particularly to a method for controlling the image processing device using a programming language for image processing, which is suitable to the control of the image processing device utilizing polygonal approximation processing.

2. Description of the Prior Art

There have been proposed two image processing methods, the pattern matching method and the SRI algorithm method, as a somewhat versatile and accordingly a kind of standard image processing algorithm which is directly related with pattern recognition, not with the filtering of an image and the inter-image operation.

The pattern matching method essentially requires a considerable amount of computation and therefore it is actually performed utilizing hardware in most cases and is not an object to be controlled by programming language. The SRI algorithm method does not have much flexibility in its flow of processing and permits only certain parameters to be changed. One of the image processing languages based on this SRI algorithm has been discussed in an article entitled, "Programming Vision and Robotics Systems with RAIL" RDBO TSVI, Conference Proceedings, Mar. 2–4, 1982, pp 392–406 Robotics International of SME. This language, however, permits only the parameters to be changed and the processing results to be referenced, and does not have any freedom in terms of the image processing procedure.

On the other hand, one example of the programming languages describing the flow itself of image processings has been discussed in an article entitled "AML/V: An Industrial Machine Vision Programming System". The International Journal of Robotics Research, Vol. 1, No. 3, 1982. However, this language has only the instructions for performing elementary or basic processings, such as the inter-image operation, which are not directly related with pattern recognition and consequently, writing a recognition program using this language requires substantially the same amount of labor and knowledge as that required in the case of using other general purpose programming languages.

SUMMARY OF THE INVENTION

In view of the foregoing, it is an object of this invention to provide an image processing method which permits the processing procedure to be minutely changed so as to be adapted to several uses requiring different processing procedures.

It is another object of this invention to provide an image processing method which can easily develop an application system employing a polygonal approximation processing with only a small amount of additional software developed using an image processing language.

In an image processing device, provision of means for controlling the processing procedure by the processing device to exchange the programs gives greater changeability in the image processing procedure. In this case, however, the hardware for image processing, including an image input/output circuit must be implemented by programming, while the software used has many fixed portions related with the hardware or the image processing system to be used. Therefore, describing the program in a universal programming language such as FORTRAN requires a great amount of labor, which is not efficient.

In accordance with this invention, this drawback is obviated by describing the image processing procedure in a programming language incorporating a group of image processing instructions corresponding to several steps serving as basic units in the flow of the polygonal approximation processing.

Image data have has an inherent structure dependent upon the hardware and processing system used so that describing them in the universal programming language such as FORTRAN is complicated and hence errors are liable to occur.

Thus, in accordance with this invention, the image processing language is constructed in the form of a programming language in which the structure of the image data used is defined in the form of variables on the basis of the hardware, image processing system, etc. so that the development efficiency of the image processing system can be improved so as to allow this invention to be used in various application fields.

Other objects and advantages of this invention will become apparent from the following description taken in conjunction with the accompanying drawings.

DESCRIPTION OF THE PREFERRED EMBODIMENTS

Figure 1:
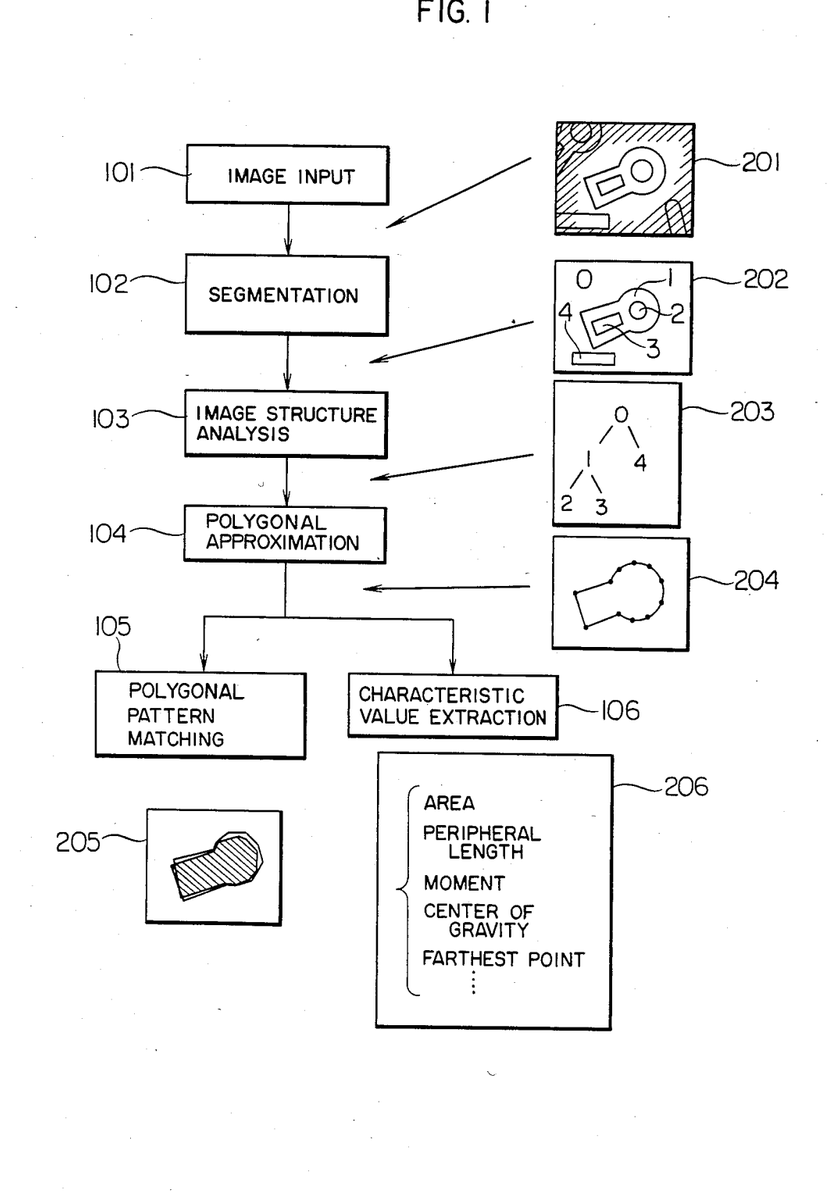
FIG. 1 diagrammatically illustrates a basic procedure of a polygonal approximation processing system.

Several embodiments of this invention will be explained below with reference to the drawings. Referring now to FIG. 1, a polygonal approximation processing system will be explained. The polygonal approximation processing system is a pattern recognition system in which the contour of a segment is polygonal-approximated so that it is represented by a row of vertex coordinates or data, which is processed to provide the information regarding the segment shape, e.g., area or perimeter and to check whether or not two patterns are identical. This pattern recognition system was disclosed in detail in Japanese Patent Unexamined Application No. 154574/84 ch was assigned to the assignee of this application.

The flow of processing in this polygonal approximation processing system will be explained below. First, an image is input at a step 101 (see block 201) and the image is segmented at a step 102 of segmentation as seen from a block 202. At a step 103 of image structure analysis, the contiguous or positional relation among the above segments is provided as seen from a block 203. The segment to be recognized is selected from this information of the contiguous or positional relation and is polygonal-approximated at a step of polygonal approximation. This polygonal-approximated segment is processed for recognition at a step 105 of polygonal pattern matching or a step 106 of characteristic value extraction. The polygonal pattern matching is the matching by the superposition on a dictionary pattern which is also polygonal-approximated as seen from a block 205, and the characteristic value extraction is, as seen from block 206, the recognition of shape by the characteristic values representative of the shape, e.g., area, perimeter, etc., and the positioning of a pattern using the center of gravity, axis of inertia, etc.

The advantage of the polygonal approximation processing system resides in its great changeability in the flow of processings. For example, any segment after the image structure analysis can be selected as a segment to be recognized, and the segment subjected to the polygonal approximation can be recognized by many recognition methods. The flow of the entire procedure of polygonal approximation processing is simple. Therefore, the polygonal approximation processing system can be easily modified so as to be suited for a particular use by changing the combination of the steps each used as a processing unit in FIG. 1 and providing branches in dependence on the intermediate results.

Figure 2:
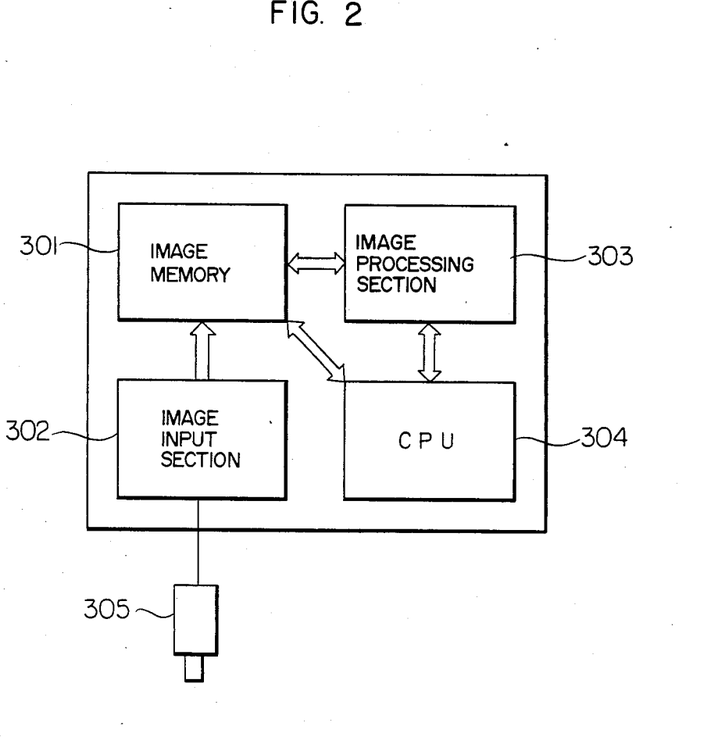
FIG. 2 shows an arrangement of an image processing device.

Referring now to FIG. 2, an example of the image processing device for performing an image processing on the basis of the polygonal approximation system will be explained. In the figure, numeral 301 designates an image memory; 302 designates a image input section; 303 designates an image processing section; 304 designates a processor (CPU); and 305 designates a TV camera. The control of the image processing procedure is made by executing the program describing the processing procedure by CPU 304.

A programming language (image processing language) for describing this program will now be explained. The basic structure consists of a known programming language, e.g., BASIC and a group of image processing instructions as extension instructions, and image variables as types of variables.

Figure 3:
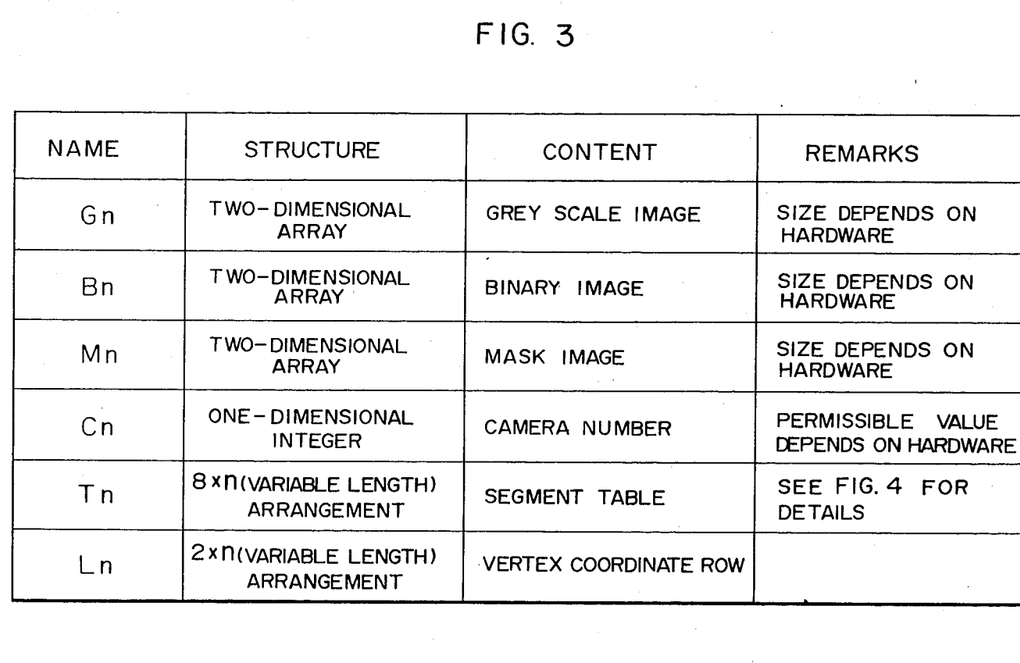
FIG. 3 is a table of image variables.
Figure 4A:
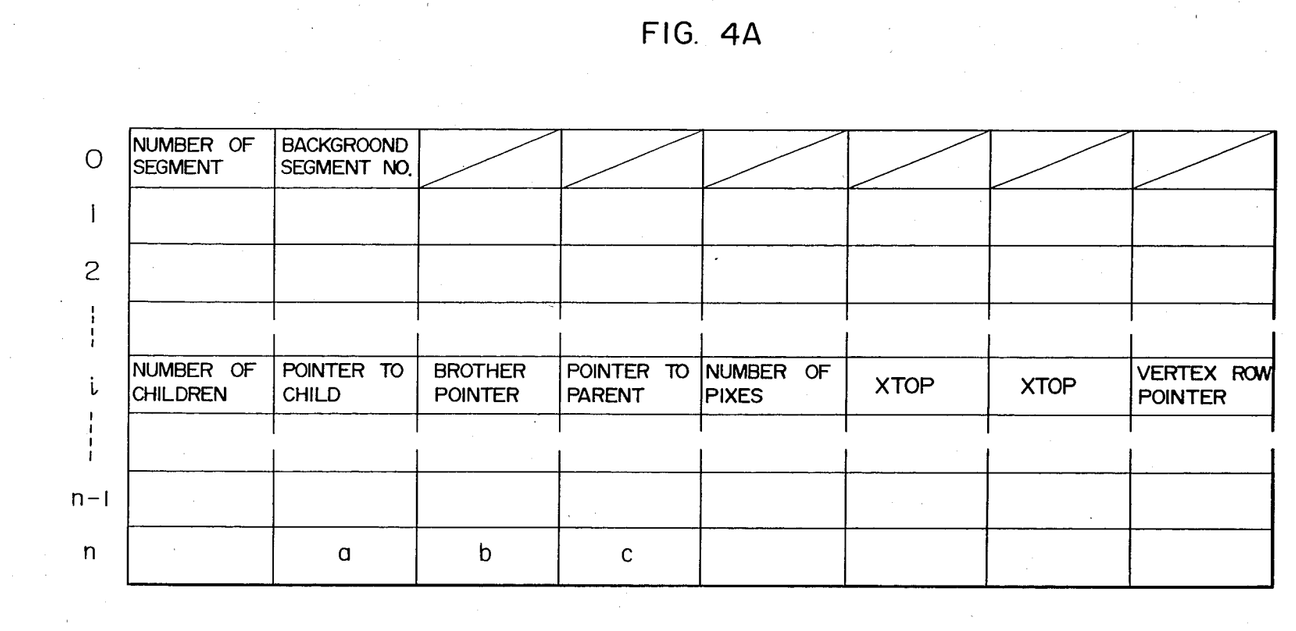
FIGS. 4A to 4C show an arrangement of a segment table.
Figure 4B:
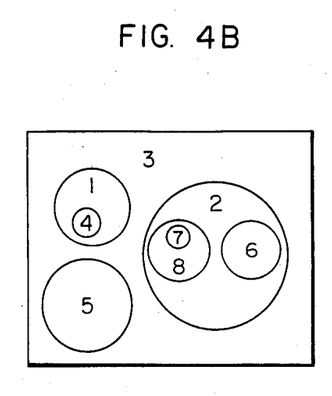
Figure 4C:
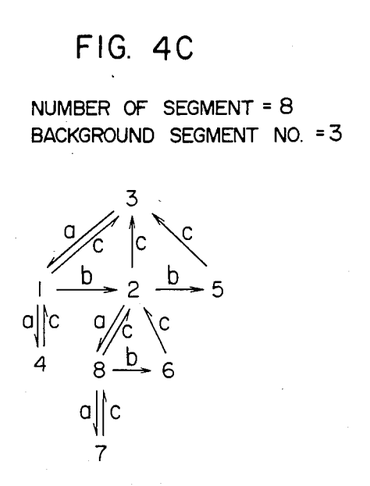

First, the image variables will be explained with reference to FIG. 3. The image variables are the variable types which represent the structure of the image data used in the polygonal approximation processing system. There are, as variables, grey scale image, binary image, mask image, segment table, and row of vertex coordinates. These variables are named, e.g., $G_1$, $T_6$, and $L_3$ each consisting of a head character representing the type of the variables and a number to identify each of a plurality of variables all of which are of the same type. G is the head character of Grey Scale Image, T is the head character of Tree which corresponds to a table to record the tree structure representative of the relation among regions in a picture image, and L is the head character of Lines which are the sides of a polygonal approximated segment. More specifically, the grey scale image, binary image and mask image correspond to respective image memories actually used, and the numbers thereof are fixed; the structures thereof are two-dimensional arrays, respectively. The segment table which is a table for supervising the relations among the segments is a table containing the information regarding the segments of an image, e.g., contiguous state or positional relationship among the segments, positions and areas of the segments, and the like. One segment table corresponds to one image. The size thereof depends upon the number of the segments included in the image and is variable. Each data in the segment table is assumed to be in the form of an integer. One example of the segment table is shown in FIGS. 4A to 4C. The illustrated segment table is that of the two-dimensional image, and therefore all the contiguous states or positional relationships are "include", "included". First, the segment table contains the number of the segments (children) included. Next, the "include" and "included" are represented by three kinds of pointer. More specifically, the relation of "include" or "included" is represented by a parent-child relation. Namely, if A includes B, A is a parent and B is the child. In this case, there are one parent pointer c and one child pointer a. However, although the number of the parent is always only one, that of the child is not necessarily one so that the number of the parent pointer is insufficient. Thus, when there are plural child segments, only one of them is designated by the child pointer 1 and the remaining child segments are connected with each other by brother pointers b. Each pointer is provided with an end mark at the end thereof. The segment table further includes area (number of pixels), coordinates (XTOP, YTOP) at the left-top end point of the segment indicating the segment positions, and pointers indicating the rows of vertex coordinates corresponding to the segments.

The structure of the image data employed in the polygonal approximation processing system can be defined by the image variables mentioned above, so that users are not required to define it by themselves, and therefore the programming is made easy and errors associated with the programming do not occur.

Figure 5:
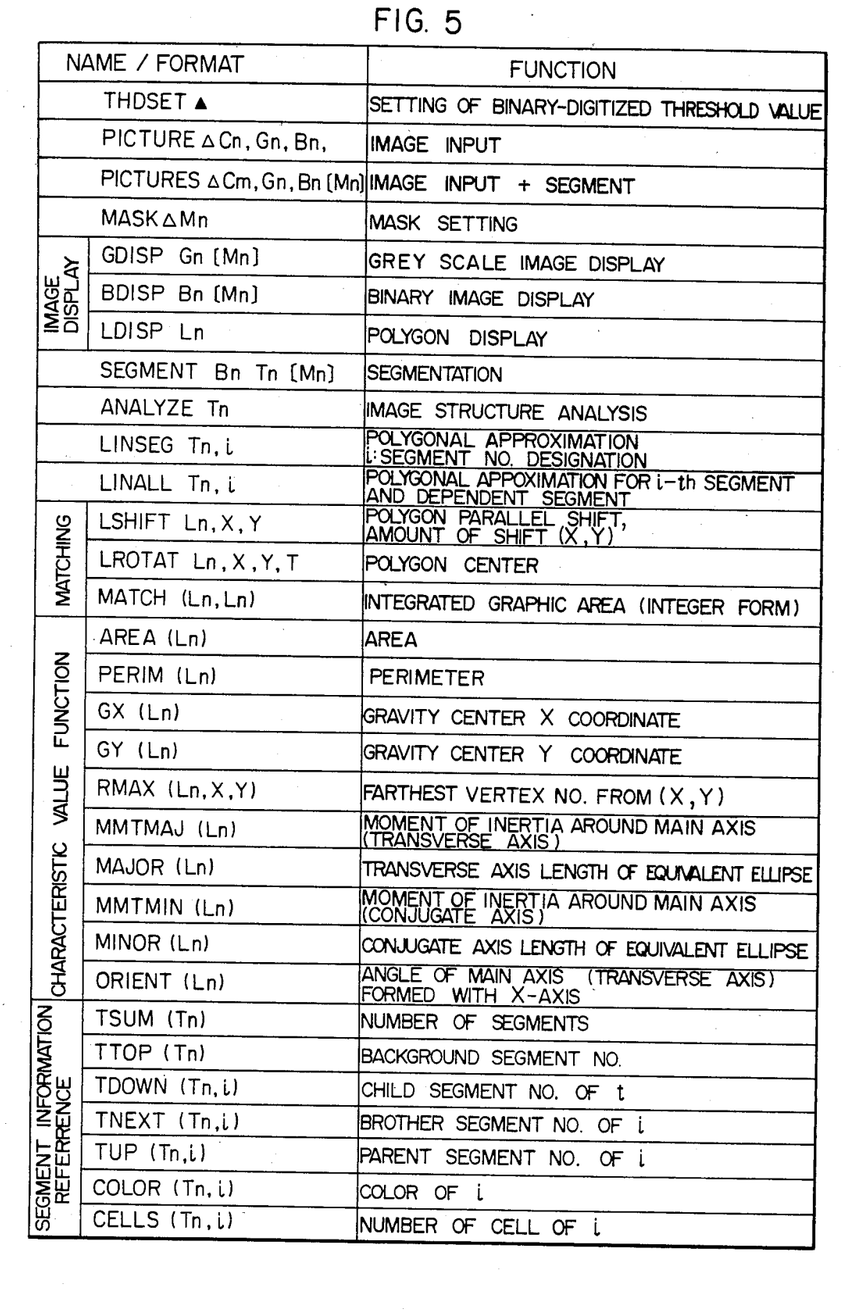
FIG. 5 is a table of image processing instructions.

The image processing instructions will be explained with reference to FIG. 5. Each image processing instruction represents each of the processing units in the polygonal approximation processing system explained with reference to FIG. 1 by one instruction or function. The image input at a step 101 corresponds to an image input instruction PICTURE, and the segmentation at a step 102 corresponds to a segmentation instruction SEGMENT. Since these two steps are successively executed in many cases, an instruction PICTURES is used for this purpose. The image structure analysis at a step 103 corresponds to an instruction ANALYZE, and the polygonal approximation at a step 104 corresponds to an instruction LINSEG.

The polygonal pattern matching at step 105 includes parallel shift LSHIFT and rotational shift LROTAT which are instructions for performing the shift to superpose two patterns on each other, and MATCH which is a function for calculating the area of the superposed portion. The characteristic value extraction at a step 106 includes characteristic value functions such as AREA, PERIM, etc. Further, there are also functions such as THDSET for setting a binary digitized threshold value, MASK for setting a processing area, and TSUM, TTOP for referring to the segment table, etc.

Figure 6A:
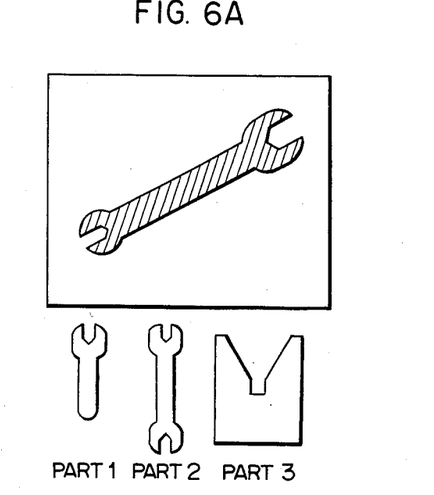
FIGS. 6A to 6C and FIGS. 7A to 7C show examples of the application of this invention to an actual recognition object, respectively.
Figure 6B:
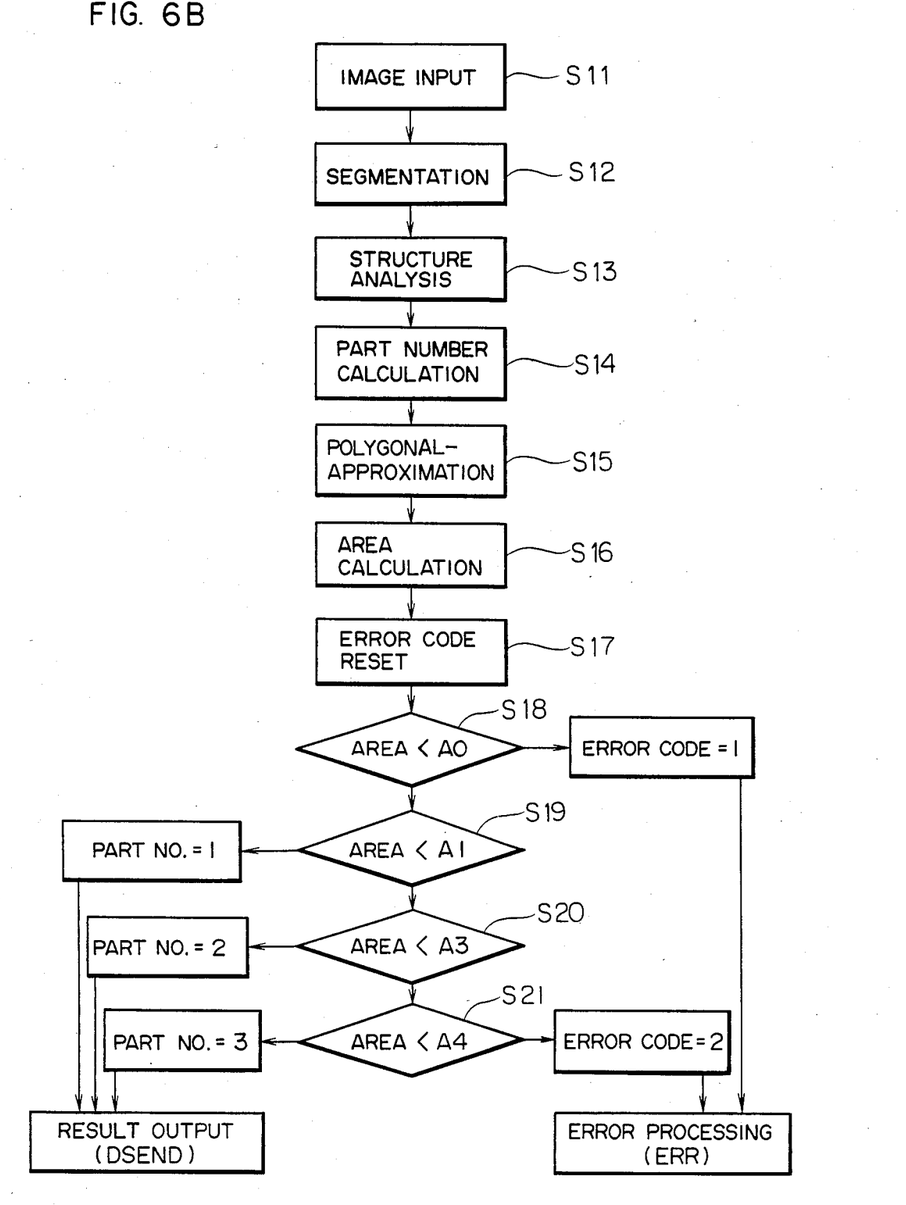
Figure 6C:
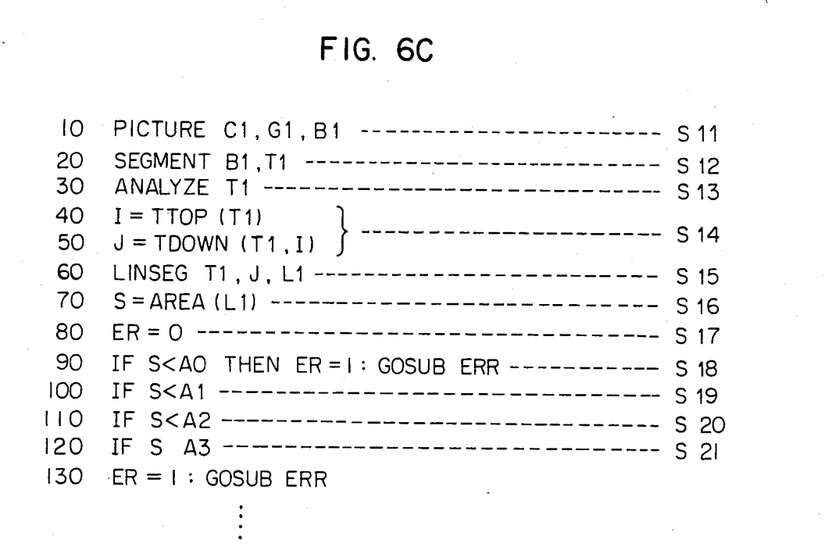

The program describing the image processing procedure will be explained with reference to FIGS. 6A to 6C. The illustrated example intends to discriminate parts 1, 2 and 3 from one another according to their area. FIG. 6A shows the parts to be recognized; FIG. 6B shows the processing procedure; and FIG. 6C shows an exemplary program description corresponding to this procedure. First, an image is stored into a grey scale image memory $G_1$ and a binary memory $B_1$ from a camera No. 1 by the image input instruction PICTURE; it is now assumed that the binary digitized threshold value has previously been set by the threshold value setting instruction THDSET (step S11). The image on the binary memory $B_1$ is segmented by the segmentation instruction SEGMENT and the result of the segmentation is stored in the segment table $T_1$ (step S12). The image structure analysis is carried out by the structure analyzing instruction ANALYZE (step S13). A background segment number I is first calculated using the segment information reference functions TTOP and TDOWN and thereafter the segment number J directly depending upon this is calculated. Thus, an optional part placed in the uniform background is selected (step S14). This selected part J is polygonal-approximated by the line-segmentation instruction LINSEG to provide the vertex row $L_1$ (step S15). The area S of the part J is calculated by the area function AREA on the basis of $L_1$ (step S16). On the basis of this result, part numbers, error codes, etc. are reset at step S17 et seq. to perform the branching into the processing routine in each case.

Figure 7A:
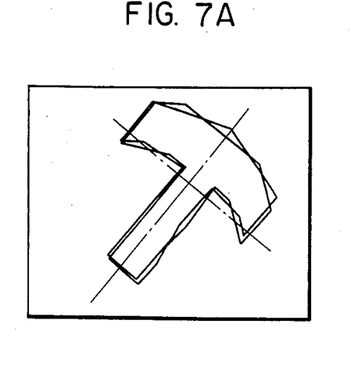
Figure 7B:
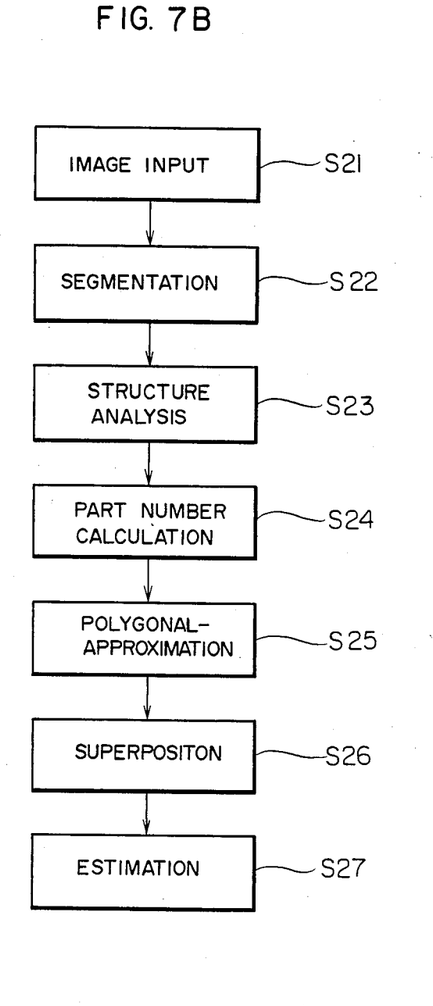
Figure 7C:
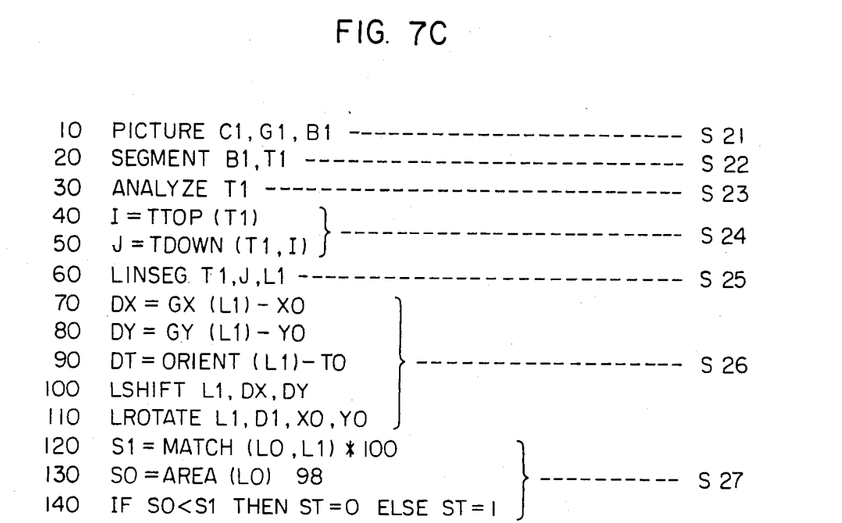

A program for determining the polygonal approximation pattern matching will be explained with reference to FIGS. 7A to 7C. FIG. 7A shows the state where the part to be recognized is superposed on a dictionary pattern; FIG. 7B shows the processing procedure; and FIG. 7C shows an exemplary program description corresponding to this procedure. First, an image is stored into the grey scale image memory $G_1$ and the binary memory $B_1$ from the camera No. 1 by the image input instruction PICTURE; it is now assumed that the binary-digitized threshold value has previously been set by the setting instruction THDSET (step S21). The image on the binary memory $B_1$ is segmented by the segmentation instruction SEGMENT and the result of the segmentation is stored in the segment table $T_1$ (step S22). The image structure analysis is carried out by the structure analyzing instruction ANALYZE (step S23). The segment number J is calculated using the segment information reference functions TTOP and TDOWN in the same manner as in the example shown in FIG. 6 (step S24). The part J is polygonal-approximated by the line-segmentation instruction LINSEG to provide the vertex row $L_1$ (step S25). The following steps are the matching thereof with a dictionary pattern by the polygonal approximation pattern matching; and it is now assumed that the dictionary pattern is represented by a vertex row $L_0$ and has gravity center coordinates ($X_0$, $Y_0$) and an orientation $T_0$. First, at lines 70–90 in FIG. 7C, the gravity center coordinates and orientation of the part J are obtained by gravity center functions GX, GY and an orientation function ORIENT, and thereafter The positional deviation (DX, DY, DT) thereof from those of the dictionary pattern $L_0$ is obtained. Next, at lines 100 and 110, the vertex row $L_1$ representative of the part J is shifted so as to have the same gravity center coordinates and orientation as those of the dictionary pattern $L_0$ by the pattern shifting instructions LSHIFT and LROTAT (step S26). The area superposed between $L_0$ and $L_1$ is calculated by a matching instruction MATCH. If the area is larger than 98% of the area $S_0$ of the dictionary pattern calculated by an area function AREA at a line 130, the estimation ST=0 is assumed and if the former is smaller than the latter, the estimation ST=1 is assumed (step S26).

In this way, only writing such a short program as described above permits the same image processing device to execute pattern recognition in several kinds of procedure.

In accordance with this invention, there is provided an image processing device which can easily develop an application system employing polygonal approximation processing by developing a small amount of software using an image processing language since the polygonal approximation processing system is flexible or not fixed in its processing procedure, and hence applicable to many fields. Thus, the image processing device according to this invention does not require the development of hardware and also does not require the development of a large amount of software using a universal programming language, and consequently permits the cost to be greatly reduced.

Further, the image processing device according to this invention permits its processing procedure to be minutely changed in accordance with the purpose so that it contributes to the expansion of the application field of automation by an image processing.

We claim:

1. A method for controlling an image processing device wherein the contour of a segment forming part of an image is polygonal-approximated so that it is represented by a row of vertex data and said row of vertex data is processed to recognize the shape of the segment, comprising the steps of:

formulating an image processing procedure, to be carried out in a central processing unit in said image processing device, as a program using a programming language incorporating a group of image processing instructions corresponding to several basic processing steps in the flow of processing including a polygonal approximation processing procedure, said programming language having variables whose structure is inherently determined by an image input section of said image processing device and by run-time subroutines of said programming language; and executing said program by using said central processing unit and an image processing section of said image processing device, wherein said image processing instructions comprise an image input instruction having image variables, a segmentation instruction having image variables, a structure analysis instruction having image variables, a polygonal approximation instruction having image variables for the input image, a polygonal pattern matching instruction, and a characteristic value extraction instruction for recognizing a shape of a segment, said image processing device performing the steps of:

inputting a composite of images in response to said image input instruction, including obtaining said composite of images from an image detector and storing said composite of images in an image memory through an image input section;

storing information regarding segments into a segment table by segmenting images selected from the inputted composite of images in response to said segmentation instruction;

obtaining a positional relation among said selected images from segment information from the segment table and selecting an image to be recognized in response to said structure analysis instruction;

polygonal-approximating the selected image to be recognized in response to said line-segmentation instruction and obtaining a vertex coordinate row relating thereto and recognizing an orientation and a position of said selected image to be recognized by processing said vertex coordinate row selectively under control of the polygonal pattern matching instruction or the characteristic value extraction instruction, so that said polygonal approximation processing procedure can be made suitable for a particular use by changing the combination of the basic processing steps and by providing branches in dependence on intermediate results according to the different uses.

2. A method for controlling an image processing device according to claim 1, wherein said image processing instructions further comprise an instruction for shifting the pattern obtained by the polygonal-approximating to be superposed on a dictionary pattern that is also polygonal-approximated, and an instruction for calculating the superposed area, and said image processing device performs the steps of superposing the pattern obtained by polygonal-approximating on the dictionary pattern and calculating the superposed area by use of the area calculating instruction.

3. A method for controlling an image processing device according to claim 1, wherein said variables comprise kinds of an image, a row of vertex coordinates and a table for supervising the relations among the segments.

* * * * *